US007318450B2

(12) United States Patent
Nobili

(10) Patent No.: US 7,318,450 B2
(45) Date of Patent: Jan. 15, 2008

(54) MIXING CARTRIDGE FOR SINGLE-LEVER MIXING FAUCETS

(75) Inventor: Alberto Nobili, Borgomanero (IT)

(73) Assignee: Carlo Nobili S.p.A. Rubinetterie, Borgomanero (IT)

( * ) Notice: Subject to any disclaimer, the term of this patent is extended or adjusted under 35 U.S.C. 154(b) by 358 days.

(21) Appl. No.: 10/528,827

(22) PCT Filed: Oct. 24, 2003

(86) PCT No.: PCT/EP03/11822

§ 371 (c)(1),
(2), (4) Date: Mar. 23, 2005

(87) PCT Pub. No.: WO2004/040179

PCT Pub. Date: May 13, 2004

(65) Prior Publication Data

US 2006/0118185 A1 Jun. 8, 2006

(30) Foreign Application Priority Data

Oct. 31, 2002 (IT) .......................... MI2002A2328

(51) Int. Cl.
*F16K 11/06* (2006.01)
(52) U.S. Cl. .................. 137/625.41; 251/339
(58) Field of Classification Search ............. 137/624.4, 137/625.41; 251/339
See application file for complete search history.

(56) References Cited

U.S. PATENT DOCUMENTS

| | | | | |
|---|---|---|---|---|
| 3,957,081 A | * | 5/1976 | DeWavrin et al. ....... | 137/625.4 |
| 4,185,659 A | * | 1/1980 | Bernat .................... | 137/625.17 |
| 4,274,442 A | * | 6/1981 | Bernat et al. .......... | 137/625.17 |
| 4,687,025 A | * | 8/1987 | Kahle et al. ............ | 137/625.17 |
| 4,942,902 A | | 7/1990 | Knapp | |
| 5,095,934 A | * | 3/1992 | Iqbal .......................... | 137/270 |
| 5,165,446 A | * | 11/1992 | Mols et al. ............. | 137/625.17 |
| 5,657,791 A | * | 8/1997 | Graber .................. | 137/625.41 |
| 6,371,163 B1 | * | 4/2002 | Kahle et al. ............. | 137/625.4 |

FOREIGN PATENT DOCUMENTS

| | | |
|---|---|---|
| CH | A-488 955 | 4/1970 |
| DE | A-35 18 698 | 11/1986 |
| DE | U-91 02 027 | 6/1992 |
| DE | A-41 01 955 | 7/1992 |
| EP | A-0 254 957 | 2/1988 |
| FR | A-2 515 772 | 5/1983 |

\* cited by examiner

*Primary Examiner*—John Fox
(74) *Attorney, Agent, or Firm*—Modiano & Associati; Albert Josif; Daniel J. O'Byrne

(57) ABSTRACT

A mixing cartridge for single-lever mixing faucets, which comprises a substantially cylindrical container accommodating a base disk, arranged proximate to one of the end faces of the container and moving two intake ports connectable respectively to a cold and hot water feed ducts, a mixing disk, superimposed on the base disk and crossed by a mixing port. The mixing disk is movable with respect to the base disk, by way of an actuation connected to the mixing disk varying its position and that of the mixing port with respect to the intake ports to vary the degree of opening or the ratio between the degrees of opening of the intake ports. The mixing port is connected to a discharge duct that exits from the container at the end face of the container that lies opposite the base disk.

10 Claims, 3 Drawing Sheets

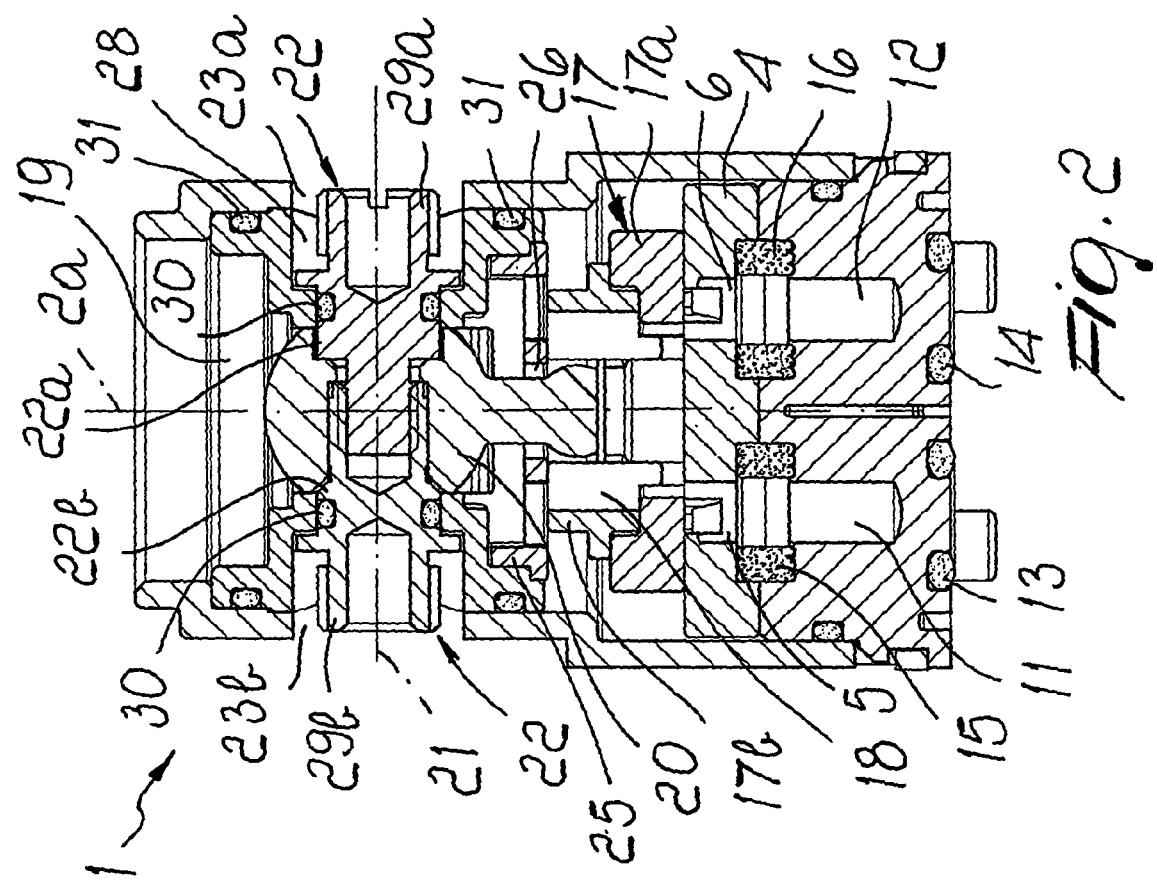
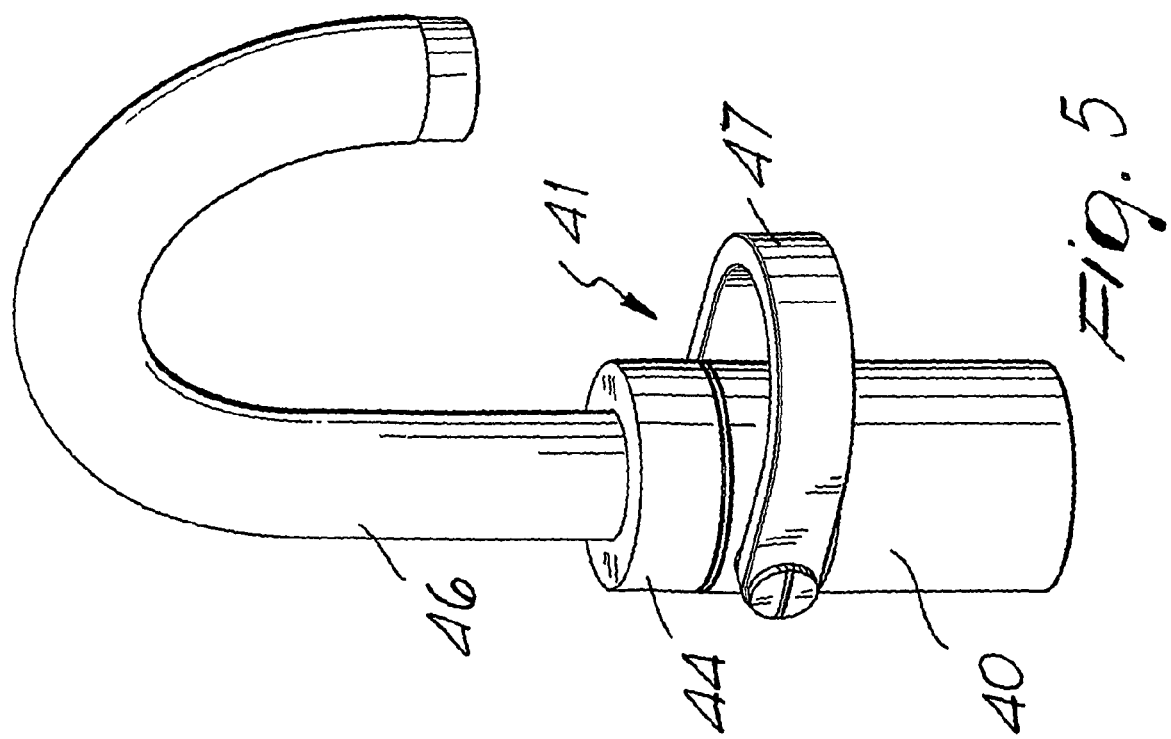

MIXING CARTRIDGE FOR SINGLE-LEVER MIXING FAUCETS

TECHNICAL FIELD

The present invention relates to a mixing cartridge for single-lever mixing faucets.

BACKGROUND ART

Conventional mixing cartridges for single-lever mixing faucets generally comprise a substantially cylindrical container, which accommodates a base disk, made of ceramic material, arranged proximate to one of the bases of the container and crossed by three ports, respectively an intake port that can be connected to a duct for feeding hot water, another intake port that can be connected to a duct for feeding cold water, and a discharge port that can be connected to a dispensing outlet of the faucet in the body of which the cartridge is fitted.

The base disk usually rests with one of its faces against one of the bases of the container, and such base is crossed by three holes that are connected to the three ports. A mixing disk made of ceramic material is slidingly coupled to the opposite face of the base disk.

Such mixing disk has, on its side directed toward the base disk, a recess, a portion of which is usually constantly connected to the discharge port.

The mixing disk can slide on command with respect to the base disk both with a translational motion on the plane on which it is coupled to the base disk and with a rotary motion about an axis that is perpendicular to the coupling plane.

By way of the translational motion, the mixing disk varies the passage sections of the intake ports that are connected to the recess, keeping their ratio constant so as to vary the flow-rate of dispensed water without varying the ratio between hot water and cold water, whilst by means of the rotary motion the mixing disk varies the ratio between the passage sections of the intake ports that are connected to the recess, accordingly varying the ratio between hot water and cold water.

The movement of the mixing disk is actuated by a lever that is supported by the container of the cartridge and is usually rotatable about the axis of the container and about an axis that is perpendicular to the axis of the container in order to produce the two movements of the mixing disk.

These mixing cartridges are accommodated and locked in an appropriately provided cavity formed in the body of mixing faucets. Usually, the bottom of this cavity, on which the base of the container of the cartridge with the three holes rests, is provided with the outlets of the ducts for feeding hot and cold water and the inlet of the duct that leads to the dispensing outlet of the faucet.

This construction of the mixing cartridges, with the two intake ports and the discharge port formed in a same base of the cartridge, has constrained considerably the design and styling of mixing faucets.

Up to now, in order to be free from the constraints imposed by mixing cartridges characteristics it was necessary to renounce their use and to deal with significantly higher faucet manufacturing and maintenance costs.

DISCLOSURE OF THE INVENTION

The aim of the present invention is to solve the problem described above by providing a mixing cartridge for single-lever mixing faucets that allows to provide mixing faucets with various aesthetic and functional criteria that are completely different from those set by current ceramic-disk mixing cartridges.

Within this aim, an object of the invention is to provide a mixing cartridge that allows to provide mixing faucets with a styling that can be significantly different from the styling of mixing faucets that use conventional mixing cartridges.

Another object of the invention is to provide a mixing cartridge that retains the advantages of ceramic-disk mixing cartridges as regards easy installation and maintenance.

This aim and these and other objects that will become better apparent hereinafter are achieved by a mixing cartridge for single-lever mixing faucets, characterized in that it comprises a substantially cylindrical container that accommodates a base disk, which is arranged proximate to one of the end faces of said container and in which two intake ports are provided that can be connected respectively to a cold water feed duct and to a hot water feed duct, and a mixing disk, which is superimposed on said base disk and is crossed by a mixing port, said mixing disk being able to move with respect to said base disk, actuation means being provided which are connected to said mixing disk and can be actuated in order to vary the position of said mixing disk and of said mixing port with respect to said intake ports and accordingly vary the degree of opening of said intake ports or the ratio between the degrees of opening of said intake ports, said mixing port being connected to a discharge duct that exits from said container at the end face of said container that lies opposite said base disk.

BRIEF DESCRIPTION OF THE DRAWINGS

Further characteristics and advantages of the invention will become better apparent from the description of a preferred but not exclusive embodiment of the mixing cartridge according to the invention, illustrated by way of non-limiting example in the accompanying drawings, wherein:

FIG. 2 is a sectional view, taken along an axial plane, of the cartridge according to the invention in the assembled condition;

FIG. 5 is a perspective view of an example of a mixing faucet that uses the cartridge according to the invention.

WAYS TO CARRYING OUT THE INVENTION

Figure 1:
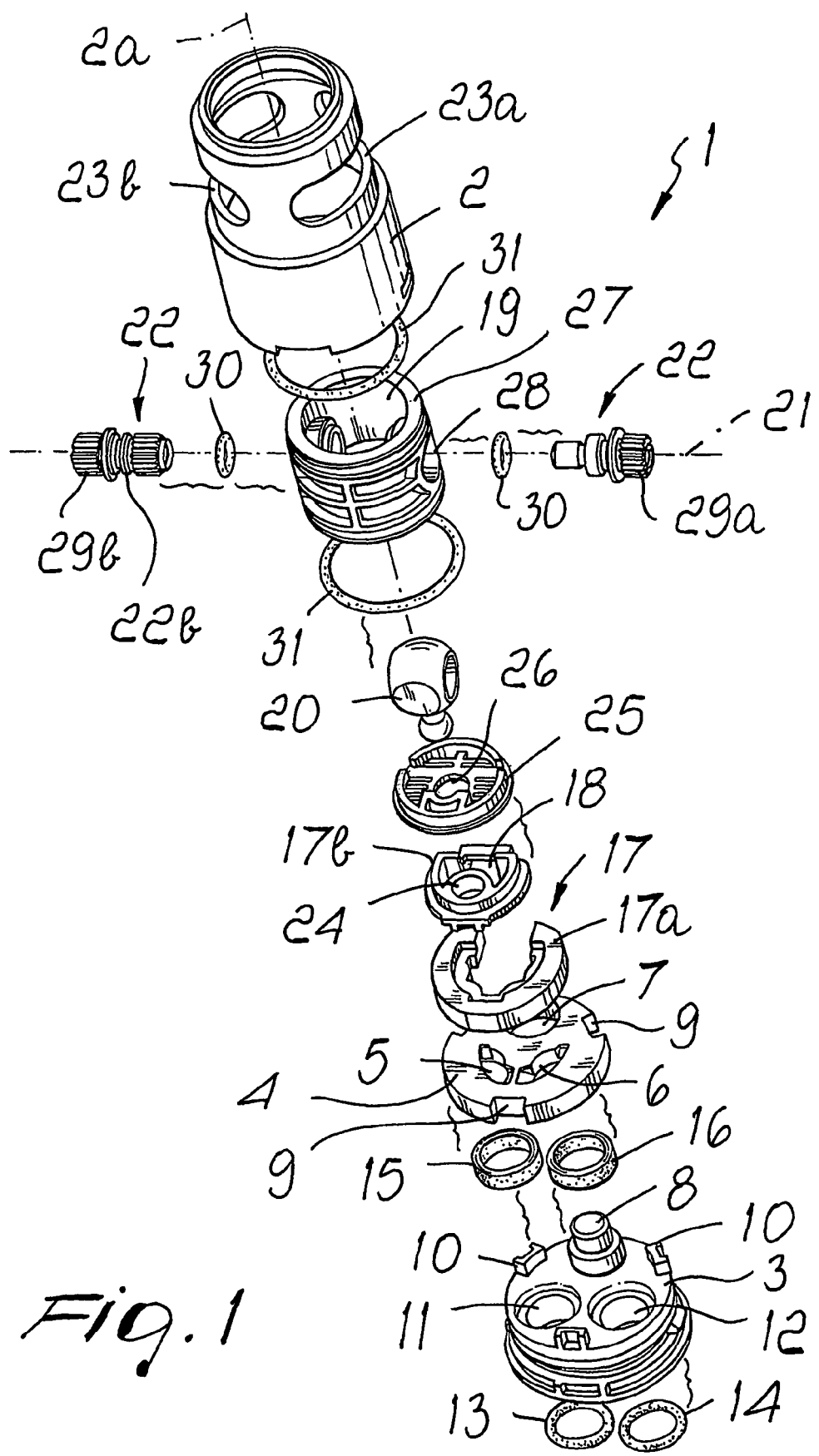
FIG. 1 is an exploded perspective view of the cartridge according to the invention.

With reference to figures, the mixing cartridge according to the invention, generally designated by the reference numeral 1, comprises a container 2 that is substantially cylindrical and is closed at one of its axial ends by a cover 3.

A base disk 4, preferably made of ceramic material, rests on the face of the cover 3 that is directed toward the inside of the container 2, and is crossed by two intake ports 5 and 6, which can be connected respectively to a cold water feed duct and to a hot water feed duct.

More particularly, the cover 3 is associated detachably with the container 2 and is coupled thereto so that the cover 3 cannot rotate with respect to the container 2 about the axis 2a of said container 2.

The base disk 4 is crossed by a positioning hole 7, which can be engaged by a protrusion 8 provided correspondingly on the face of the cover 3 that is directed toward the inside of the container 2. Furthermore, the base disk 4 is provided peripherally with notches 9 that can be engaged by protrusions 10 that protrude from the face of the cover 3 that is directed toward the inside of the container proximate to the peripheral region of said face. In this manner, the base disk 9 is rigidly coupled to the cover 3 and therefore to the container 2 without allowing the rotation of the base disk 4, with respect to the container 2 and the cover 3, about the axis 2a of the container 2.

The cover 3 is crossed by two holes 11 and 12, which are located at the intake ports 5 and 6 and allow to connect said intake ports 5 and 6 to the hot and cold water feed ducts, as will become better apparent hereinafter.

Annular seats are provided on the face of the cover 3 that is directed toward the outside of the container 2, around the holes 11 and 12, and accommodate annular sealing gaskets 13 and 14.

Seats that accommodate annular gaskets 15 and 16 that provide the hermetic connection between the holes 11 and 12 and the intake ports 5 and 6 are provided also on the face of the cover 3 that is directed toward the inside of the container 2, around the holes 11 and 12.

The cartridge according to the invention comprises a mixing disk 17, preferable made of ceramic material, which rests slidingly on the face of the base disk 4 that is directed away from the cover 3.

The coupling plane of the mutually facing faces of the base disk 4 and of the mixing disk 17 is substantially perpendicular to the axis 2a of the container 2.

The mixing disk 17 is conveniently formed in two parts, respectively a peripheral part 17a and a central part 17b.

The central part 17b is crossed by a mixing port 18 and the mixing disk 17 can move as a whole, with respect to the base disk 4, in order to open and close the intake ports 5 and 6 and in order to vary the degree of mixing of the hot water with the cold water.

More particularly, the mixing disk 17 can move with respect to the base disk 4 along a direction that is parallel to the coupling plane of the disks 4 and 17 for varying the degree of opening of the intake ports 5 and 6, and can rotate about an axis that is perpendicular to said coupling plane, with respect to the base disk 4, in order to vary the ratio between the degrees of opening of the intake ports 5 and 6.

The mixing disk 17 can perform a translational motion with respect to the base disk along the direction that is parallel to the coupling plane starting from a closed position, in which the mixing port 18 is spaced laterally with respect to the intake ports 5 and 6 so as to be located at a region of the base disk 4 that is not connected to the intake ports 5 and 6 in order to close the intake ports 5 and 6 in this manner, to open positions, in which the mixing port 18 at least partially overlaps at least one of the intake ports 5 and 6.

The cartridge is provided with actuation means that are connected to the mixing disk 17 and can be actuated in order to produce the translational or rotational motion, as mentioned above, by changing the position of the mixing disk 17 and therefore of the mixing port 18 with respect to the intake ports 5 and 6.

The mixing port 18 is connected to a discharge duct 19 that protrudes from the container 2 at the base or end face of said container 2 that lies opposite with respect to the base disk 4.

The actuation means of the mixing disk 17 comprise a lever 20, which is pivoted to the container 2 about a pivoting axis 21 that is parallel to the plane on which the mixing disk 17 and the base disk 4 are coupled and is connected to the mixing disk 17. Said lever 20 can rotate with respect to the container 2 about the pivoting axis 21 in order to produce the translational motion of the mixing disk 17 with respect to the base disk 4 and about the axis 2a of the container 2 in order to produce the rotation of the mixing disk 17 with respect to the base disk 4.

The lever 20 is fixed at one of its longitudinal ends, to a shaft 22, the axis of which forms the pivoting axis 21. Said shaft 22 is supported so that it can rotate about the axis 21 by the container 2 and protrudes, with its axial ends, from the container 2 through passages 23a, 23b that are arranged in an arc-like configuration on the lateral surface of the container 2 so as to allow the shaft 22 to rotate about the axis 2a of the container 2 with respect to said container 2.

The shaft 22 is conveniently provided in two parts 22a, 22b that can be coupled coaxially, for example by means of a screw coupling, so as to allow to assemble the lever 20 inside the container 2.

The end of the lever 20 that lies opposite to the end that is fixed to the shaft 22 rotatably engages in a seat 24 formed in the face of the mixing disk 17 that lies opposite the face that is coupled to the base disk 4.

It should be noted that the lever 20, when the mixing disk 17 is in the closed position, i.e., with the mixing port 18 spaced laterally with respect to the intake ports 5 and 6, is arranged coaxially to the container 2, so that a rotation of the shaft 22 about the axis 2a leads to a free rotation of the lever 20 within the seat 24, i.e., does not produce any movement of the mixing disk 17 with respect to the base disk 4.

Conveniently, a grille-like plate 25 is arranged along the discharge duct 19 inside the container 2.

Said grille-like plate 25 is arranged between the shaft 22 and the mixing disk 17 and is crossed in a central region by a hole 26 to allow the passage of the lever 20.

The shaft 22 is supported so that it can rotate about its own axis 21 by a cylindrical block 27 that is hollow internally, is inserted coaxially in the container 2, and has a passage 28 that is orientated at right angles to the axis 2a in order to allow the exit of the axial ends 29a and 29b of the shaft 22.

Annular sealing gaskets 30 are interposed between the shaft 22 and the passage 28, and also annular sealing gaskets 31 are provided between the inner surface of the container 2 and the outer surface of the cylindrical block 27.

The cartridge according to the invention is designed to be accommodated in the body 40 of a faucet, which is generally designated by the reference numeral 41.

Figure 3:
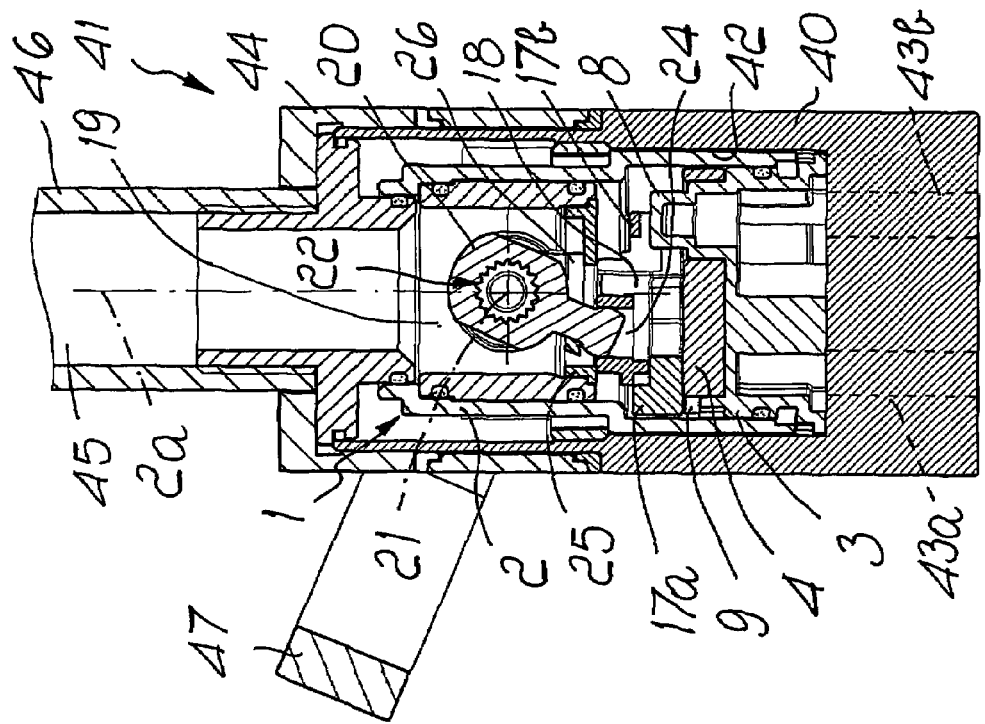
FIGS. 3 and 4 are sectional views, taken again along an axial plane but at right angles to the sectional plane of FIG. 2, of the cartridge according to the invention inserted in a faucet, respectively, in the closed position and in the fully open position.
Figure 4:
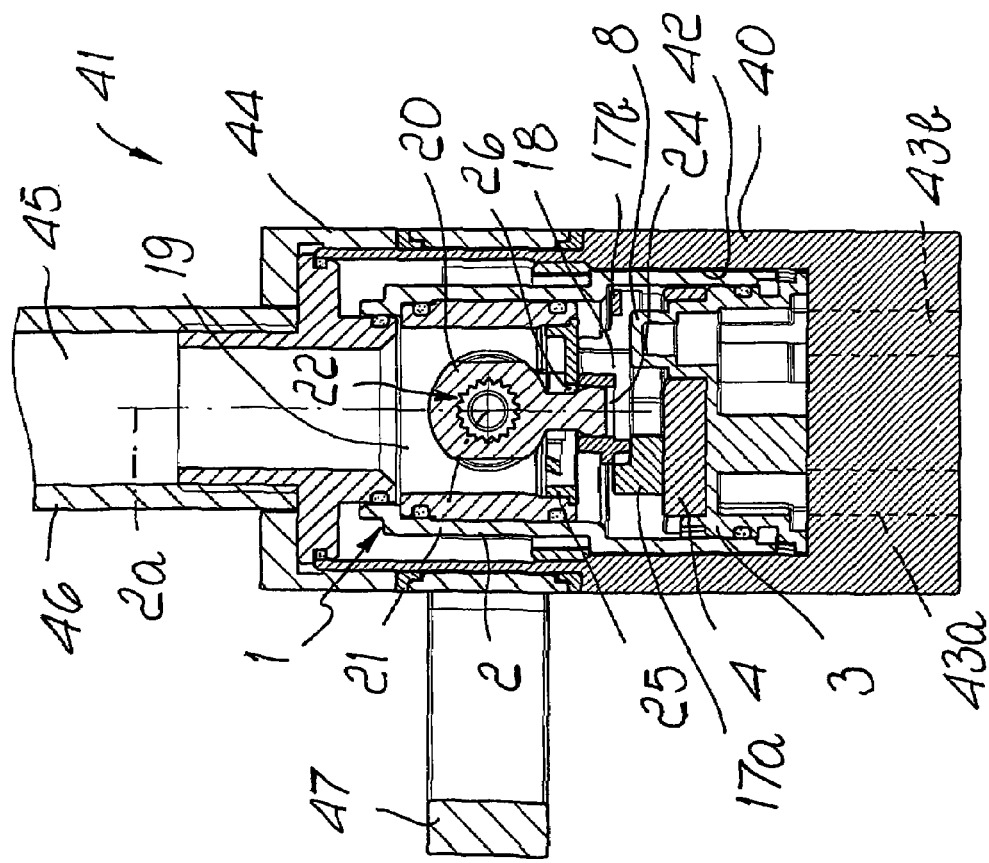

The cartridge 1 is accommodated inside a substantially cylindrical cavity 42 and rests by means of the outer side of the cover 3 on the bottom of said cavity 42, as shown in particular in FIGS. 3 and 4. The outlets of feed ducts 43a, 43b for hot and cold water are formed on the bottom of said cavity 42. The cover 3 rests on the bottom of the cavity 42 with the annular gaskets 13 and 14 interposed that surround the outlets of the feed ducts 43a, 43b, so that said ducts are connected to the holes 11 and 12 and therefore to the intake ports 5 and 6.

The cartridge 1 can be locked inside the cavity 42 in a per se known manner, for example by means of a ring 44.

The discharge duct 19, which leads outside the container 2 at the axial end face of the container 2 that lies opposite with respect to the cover 3, is connected to a dispensing duct 45 that lies within the body 40 of the faucet or in a spout 46 that is connected to the faucet body 40 and leads outside through a dispensing outlet.

The axial ends 29a and 29b of the shaft 22 are connected to an actuation lever or knob 47, which can be operated in order to turn the shaft 22 about its own axis 21 or about the axis 2a of the container 2, as will become better apparent hereinafter. Conveniently, the axial ends 29a and 29b can be knurled or provided with teeth so as to rigidly couple the lever or knob 47 to the shaft 22 in rotating about its own axis 21.

The operation of the mixing cartridge according to the invention is as follows.

With the lever or knob 47 arranged as shown in FIG. 3, the mixing disk 17 is located so that its mixing port 18 is spaced laterally with respect to the intake ports 5 and 6. In this position, which corresponds to the closed position of the faucet, the intake ports 5 and 6 are closed by the mixing disk 17 and therefore the connection of the intake ports 5 and 6 to the discharge duct 19 is prevented, and therefore the dispensing of water by the faucet is prevented. It should be noted that in this position the lever 20 is arranged coaxially with respect to the container 2 and therefore by rotating the lever or knob 47 and therefore the shaft 22 about the axis 2a of the container 2, no movement of the mixing disk 17 with respect to the base disk 4 is produced.

When the lever or knob 47 is turned about the axis 21, as shown in FIG. 4, the mixing disk 17 is moved by the rotation of the lever 20 about the axis 21 with respect to the base disk 4 along a direction that is parallel to the plane on which the base disk 4 and the mixing disk 17 are coupled. As a consequence of this movement, the mixing port 18 at least partially overlaps at least one of the intake ports 5 and 6 and therefore connects said intake port or ports 5 and 6 to the discharge duct 19, causing the faucet to dispense water.

When the mixing disk 17 is in this position, a rotation of the lever or knob 47 about the axis 2a of the container 2, since the lever 20 is no longer axially aligned with the axis 2a, produces a rotation of the mixing disk 17 with respect to the base disk 4 and therefore varies the position of the mixing port 18 with respect to the discharge ports 5 and 6, varying the ratio between the passage sections of the intake ports 5 and 6 that are cleared by the overlap of the mixing port 18. This varies the ratio between the amount of hot water and the amount of cold water conveyed along the discharge duct 19 and therefore the temperature of the water dispensed by the faucet is changed.

In practice it has been found that the mixing cartridge according to the invention fully achieves the intended aim, since by providing a discharge for the mixed water on the end face of the cartridge that lies opposite the end face where the hot and cold water enter, it frees the design and styling of mixing faucets from the constraints imposed up to now by mixing cartridges provided with water intake and discharge on the same face while maintaining all the advantages, in terms of assembly, maintenance and easy use, that are typical of ceramic-disk mixing cartridges.

The cartridge thus conceived is susceptible of numerous modifications and variations, all of which are within the scope of the appended claims; all the details may further be replaced with other technically equivalent elements.

In practice, the materials used, so long as they are compatible with the specific use, as well as the dimensions, may be any according to requirements and to the state of the art.

The disclosures in Italian Patent Application No. MI2002A002328 from which this application claims priority are incorporated herein by reference.

The invention claimed is:

1. A mixing cartridge for single-lever mixing faucets, comprising:

a substantially cylindrical container;

a base disk, accommodated in said container proximate to one end face thereof and in which two intake ports are provided that are connectable, respectively, to a cold water feed duct and to a hot water feed duct;

a mixing disk, which is superimposed on said base disk and is crossed by a mixing port, said mixing disk being movable with respect to said base disk;

actuation means connected to said mixing disk and actuatable in order to vary a position of said mixing disk and of said mixing port with respect to said intake ports, so as to vary a degree of opening of said intake ports or a ratio between the opening degrees of said intake ports; and a discharge duct connected to said mixing port and exiting from said container at an end face thereof that lies opposite said end face to which said base disk is proximate;

said base and mixing disks being mutually slidingly coupled with one face thereof arranged on a coupling plane that is substantially perpendicular to an axis of said container;

said mixing disk being movable with respect to said base disk along a direction that is parallel to said coupling plane so as to vary the degree of opening of said intake ports and being rotatable about an axis thereof that is perpendicular to said coupling plane with respect to said base disk in order to vary the ratio between the degrees of opening of said intake ports;

said actuation means comprising a lever that is pivoted to said container about a pivoting axis that is parallel to said coupling plane and is connected to said mixing disk, said lever being rotatable with respect to said container about said pivoting axis for translational motion of said mixing disk with respect to said base disk and about the axis of said container for the rotation of said mixing disk with respect to said base disk;

said lever being provided so as to rotatably engage in a seat formed on a face of said mixing disk that lies opposite said base disk.

2. The cartridge of claim 1, wherein said base and mixing disks are made of ceramic material.

3. The cartridge of claim 1, wherein said base disk is detachably locked in said container and said mixing disk is movable with respect to said base disk along said direction that is parallel to said coupling plane starting from a closed position, in which said mixing port is spaced laterally with respect to said intake ports, to open positions, in which said mixing port is at least partially superimposed on at least one of said intake ports.

4. The cartridge of claim 1, wherein said lever, when said mixing disk is in said closed position, is arranged coaxially to said container for a free rotation of said lever about the axis of said container with respect to said mixing disk.

5. The cartridge of claim 4, comprising: a shaft with an axis thereof that coincides with said pivoting axis; said lever being fixed with one of its ends to said shaft that is further supported so as to be rotatable about said axis thereof by said container and protrude with axial ends thereof from said container through passages that lie in an arc-like shape configuration on a lateral surface of said container in order to allow rotation of said shaft about the axis of said container with respect to said container.

6. The cartridge according to claim 5, wherein said lever and said shaft are arranged so as to cross inside said discharge conduit.

7. The cartridge of claim 1, wherein said container has at an end face thereof a closing cover that is crossed by two holes that are connectable to the water feed ducts and are connected to said intake ports formed in said base disk, said base disk resting on said cover with a face thereof lying opposite with respect to said mixing disk.

8. A single-lever mixing faucet, comprising a body in which a cavity is provided that is connected to a cold water feed duct and to a hot water feed duct and to a dispensing duct, wherein said cavity accommodates a mixing cartridge as set forth in claim 1, in which the intake ports of the base disk are connected to the water feed ducts and the discharge duct is connected to the dispensing duct.

9. The cartridge according to claim 1, wherein said mixing disk is formed in two parts, respectively a peripheral part and a central part, said central part being crossed by said mixing port and being provided with said seat.

10. A mixing cartridge for single-lever mixing faucets, comprising:
   a substantially cylindrical container;
   a base disk, accommodated in said container proximate to one end face thereof and in which two intake ports are provided that are connectable, respectively, to a cold water feed duct and to a hot water feed duct;
   a mixing disk, which is superimposed on said base disk and is crossed by a mixing port, said mixing disk being movable with respect to said base disk;
   actuation means connected to said mixing disk and actuatable in order to vary a position of said mixing disk and of said mixing port with respect to said intake ports, so as to vary a degree of opening of said intake ports or a ratio between the opening degrees of said intake ports;
   a discharge duct connected to said mixing port and exiting from said container at an end face thereof that lies opposite said end face to which said base disk is proximate; and
   a grille-like plate arranged along said discharge duct inside said container.

* * * * *